(12) United States Patent
Stuhec et al.

(10) Patent No.: US 10,192,202 B2
(45) Date of Patent: Jan. 29, 2019

(54) MAPPING FOR COLLABORATIVE CONTRIBUTION

(71) Applicant: SAP SE, Walldorf (DE)

(72) Inventors: Gunther Stuhec, Heidelberg (DE); Juergen Denner, Dudenhofen (DE)

(73) Assignee: SAP SE, Walldorf (DE)

( * ) Notice: Subject to any disclaimer, the term of this patent is extended or adjusted under 35 U.S.C. 154(b) by 356 days.

(21) Appl. No.: 14/755,120

(22) Filed: Jun. 30, 2015

(65) Prior Publication Data

US 2016/0189105 A1    Jun. 30, 2016

Related U.S. Application Data

(60) Provisional application No. 62/098,779, filed on Dec. 31, 2014.

(51) Int. Cl.
*G06F 15/16* (2006.01)
*G06Q 10/10* (2012.01)
*H04L 12/58* (2006.01)

(52) U.S. Cl.
CPC ......... *G06Q 10/107* (2013.01); *H04L 51/046* (2013.01); *H04L 51/063* (2013.01)

(58) Field of Classification Search
None
See application file for complete search history.

(56) References Cited

U.S. PATENT DOCUMENTS

| 7,236,939 | B2 * | 6/2007 | Chen ............... G06Q 10/06311 705/7.13 |
| 7,505,983 | B2 * | 3/2009 | Wildhagen ............... G06F 8/10 707/758 |
| 7,624,113 | B2 | 11/2009 | Stuhec |
| 7,698,174 | B2 | 4/2010 | Brunswig et al. |
| 7,711,676 | B2 | 5/2010 | Stuhec |
| 7,716,164 | B2 | 5/2010 | Stuhec |
| 7,716,255 | B2 | 5/2010 | Stuhec |
| 7,818,342 | B2 | 10/2010 | Stuhec |
| 7,836,392 | B2 | 11/2010 | Stuhec et al. |
| 7,856,597 | B2 | 12/2010 | Stuhec |
| 7,865,519 | B2 | 1/2011 | Stuhec |
| 7,937,408 | B2 | 5/2011 | Stuhec |
| 8,041,746 | B2 | 10/2011 | Stuhec |
| 8,078,568 | B2 | 12/2011 | Stuhec et al. |
| 8,086,646 | B2 | 12/2011 | Stuhec et al. |
| 8,087,030 | B2 | 12/2011 | Stuhec et al. |
| 8,150,833 | B1 | 4/2012 | Stuhec |
| 8,271,503 | B2 | 9/2012 | Glaenzer et al. |
| 8,280,755 | B2 | 10/2012 | Stuhec et al. |
| 8,290,989 | B2 | 10/2012 | Stuhec et al. |
| 8,307,027 | B2 | 11/2012 | Stuhec et al. |

(Continued)

*Primary Examiner* — Hamza N Algibhah
*Assistant Examiner* — Tesfu N Mekonen
(74) *Attorney, Agent, or Firm* — Fish & Richardson P.C.

(57) ABSTRACT

Techniques for managing communication between businesses include selecting a source message guideline including a first plurality of elements; selecting a target message guideline including a second plurality of elements; selecting a business context corresponding to the source message guideline; generating a plurality of potential mapping entities between the first plurality of elements and the second plurality of elements; and selecting mapping entities from the plurality of potential mapping entities based on an accuracy threshold of the mapping entities.

14 Claims, 10 Drawing Sheets

(56) References Cited

U.S. PATENT DOCUMENTS

| | | | |
|---|---|---|---|
| 8,381,229 B2 | 2/2013 | Stuhec et al. | |
| 8,402,053 B2 | 3/2013 | Roediger et al. | |
| 8,554,538 B2 | 10/2013 | Stuhec | |
| 8,606,723 B2 | 12/2013 | Seubert et al. | |
| 8,655,756 B2 | 2/2014 | Seubert et al. | |
| 8,676,866 B2 | 3/2014 | Lemcke et al. | |
| 8,694,397 B2 | 4/2014 | Seubert et al. | |
| 8,892,575 B2 | 11/2014 | Stuhec et al. | |
| 9,697,271 B2 * | 7/2017 | Riyaz | G06F 17/30563 |
| 2006/0106626 A1 * | 5/2006 | Jeng | G06Q 10/06 717/106 |
| 2007/0276948 A1 | 11/2007 | Burdett et al. | |
| 2009/0150854 A1 * | 6/2009 | Elaasar | G06F 8/10 717/104 |
| 2010/0077386 A1 * | 3/2010 | Akkiraju | G06F 8/36 717/136 |
| 2012/0042299 A1 * | 2/2012 | Perrin | G06F 8/10 717/104 |
| 2012/0110468 A1 | 5/2012 | Ackermann et al. | |
| 2012/0324588 A1 | 12/2012 | Stuhec et al. | |
| 2013/0204909 A1 | 8/2013 | Lemcke et al. | |
| 2015/0127343 A1 * | 5/2015 | Mullor | G10L 17/26 704/244 |
| 2015/0278243 A1 * | 10/2015 | Vincent | G06F 17/30194 707/634 |
| 2015/0339754 A1 * | 11/2015 | Bloem | G06F 17/30867 705/26.7 |
| 2016/0191431 A1 * | 6/2016 | Stuhec | H04L 51/066 709/218 |

* cited by examiner

MAPPING FOR COLLABORATIVE CONTRIBUTION

CROSS-REFERENCE TO RELATED APPLICATIONS

This application claims priority under 35 U.S.C. § 119 to U.S. Provisional Patent Application Ser. No. 62/098,779, entitled "Mapping for Collaborative Contribution" and filed on Dec. 31, 2014, the entire contents of which are incorporated by reference herein.

BACKGROUND

As the value and use of information communication related to business processes continues to increase, businesses seek additional ways to process, transfer and store information through business to business (B2B) integration processes. In order for businesses to perform B2B transactions with a trading partner when different procurements or applications are used, the business may need to perform data mapping and data cross referencing to convert data into a format desired by the business or a specific trading partner. Data mapping can be a resource intensive and complex process because technology and information can vary between different trading partners. For example, the differences can include what information is handled, how the information is handled, how much information is processed, stored, or communicated and how quickly and efficiently the information can be processed, stored or communicated.

SUMMARY

Implementations of the present disclosure include computer-implemented methods for providing communication between businesses. In an example implementation, a computer-implemented method for managing communication between businesses includes selecting a source message guideline including a first plurality of elements; selecting a target message guideline including a second plurality of elements; selecting a business context corresponding to the source message guideline; generating a plurality of potential mapping entities between the first plurality of elements and the second plurality of elements; and selecting mapping entities from the plurality of potential mapping entities based on an accuracy threshold of the mapping entities.

In a first aspect combinable with the example implementation, selecting the source message guideline includes: selecting a message template; selecting a business context; generating the source message guideline including a plurality of fields associated to the business context; and adapting the message guide by adding an additional field from a context menu.

In a second aspect combinable with any of the previous aspects, selecting the message guideline includes selecting a type system, a system version type and a message type.

In a third aspect combinable with any of the previous aspects, the business context includes one or more of an industry, a location, a business role, a business process and a business system.

In a fourth aspect combinable with any of the previous aspects, generating the plurality of potential mapping entities includes determining an accuracy of correlation between the first plurality of elements and the second plurality of elements based a correlation coefficient and a persistence of each of the plurality of potential mapping entities.

In a fifth aspect combinable with any of the previous aspects, the correlation coefficient is associated with semantic data associated with each of the first plurality of elements and the second plurality of elements.

In a sixth aspect combinable with any of the previous aspects, the persistence is determined from relevant properties of each of the first plurality of elements and the second plurality of elements, limited by a total amount of distinct business context set definitions.

In a seventh aspect combinable with any of the previous aspects, the plurality of potential mapping entities are stored as a directed acyclic graph.

In an eighth aspect combinable with any of the previous aspects, the directed acyclic graph includes one or more root nodes defining entry points of an ontology and decomposing in one or more child nodes according to domain relations.

In a ninth aspect combinable with any of the previous aspects, the domain relations define subordinate relationships of a property entity to a container entity for the context.

In a tenth aspect combinable with any of the previous aspects, each of the one or more root nodes and the one or more child nodes including a content and a hashtag.

In an eleventh aspect combinable with any of the previous aspects, the content includes one or more of example elements of a data model, activities of a business process and an ontology.

In a twelfth aspect combinable with any of the previous aspects, the hashtag includes a business context classification of a domain.

A thirteenth aspect combinable with any of the previous aspects further includes selecting a second plurality of mapping entities from the plurality of potential mapping entities based on a second accuracy threshold of the mapping entities.

Various embodiments of mapping for collaborative contribution according to the present disclosure may have one or more of the following features. For example, the present disclosure provides for automating, streamlining and simplifying the mapping process. The simplification of the mapping processes is due to, for instance, the use of a context based algorithm that uses a correlation of data corresponding to different type systems. The mapping processes may also provide a user complete visibility of the mapping entities as function of a significance of correlation threshold, enabling the user to automatically modify the number of mapping entities and also to manually add or remove mapping entities. The present disclosure includes historical storage of mapping, thus eliminating the current need for identifying the same mapping entities multiple times.

These general and specific aspects may be implemented using a device, system or method, or any combinations of devices, systems, or methods. For example, a computer-readable storage medium coupled to one or more processors and having instructions stored thereon which, when executed by the one or more processors, cause the one or more processors to perform operations in accordance with implementations of the methods provided herein.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3C depict an example storage mapping that can be executed in accordance with implementations of the present disclosure.

DETAILED DESCRIPTION

Implementations of the present disclosure are generally directed to software, computer-implemented methods, and systems for providing mapping entities between different type systems that support business communications. A type system is an independent system of data description format of reusable message and data types. Each type system can correspond to a particular business partner. A type system can be based on a combination of multiple aspects. The aspects can include responsible agency, syntax rules for syntax representation, schema notation and definition, methodology for modeling, naming and structuring, assembly rules for assembly and structuring of complete messages, template library and release lifecycle of the content in the template library.

A single agency (organization or company) can be responsible for the development and maintenance of a particular syntax, concept (methodology) and library. The definition of message types and artefacts follows the concept, which considers the naming and structuring of the schemas. A schema includes the syntax representation and schema notation that can be used for the representation of instances and schema definitions. The most used syntax representations are defined by the syntax rules of XML, JSON, ASN0.1 or a specific representation syntax as provided by a responsible agency, such as EDIFACT syntax rules (ISO 9735) or X12.5, which describes the ANSI ASC X0.12 syntax rules. The schema notation could be based on XML DTD, XSD (XML Schema), BSN (Backus Naur Notation), UML (Unified Modeling Language), EDMX (Entity-Relationship based Framework), or others. The methodology can describe the naming and structuring conventions for the representation of the semantics within the schema. For example a core component technical specification can define schemas on a semantic level. The responsible agency provides a library or directory of message types and reusable artefacts, which are the integral part of a type system. The libraries can follow an agency's defined release lifecycle (e.g., type system version) and can be provided as templates considering that business context classification is not defined.

Some domain specific subsets, such as EANCOM, EDIFICE or newer versions of CIDX, are associated to specific business contexts and are not defined as type systems. Domain specific subsets can be treated as message guidelines. Message guidelines can be used to generate mapping guidelines including multiple mapping entities. The mapping entities can be automatically generated in response to a query processed by a data model. The data model includes a correlation method and a storage model and enable the business partners to adapt the mapping entities to particular business contexts and requirements.

Figure 1:
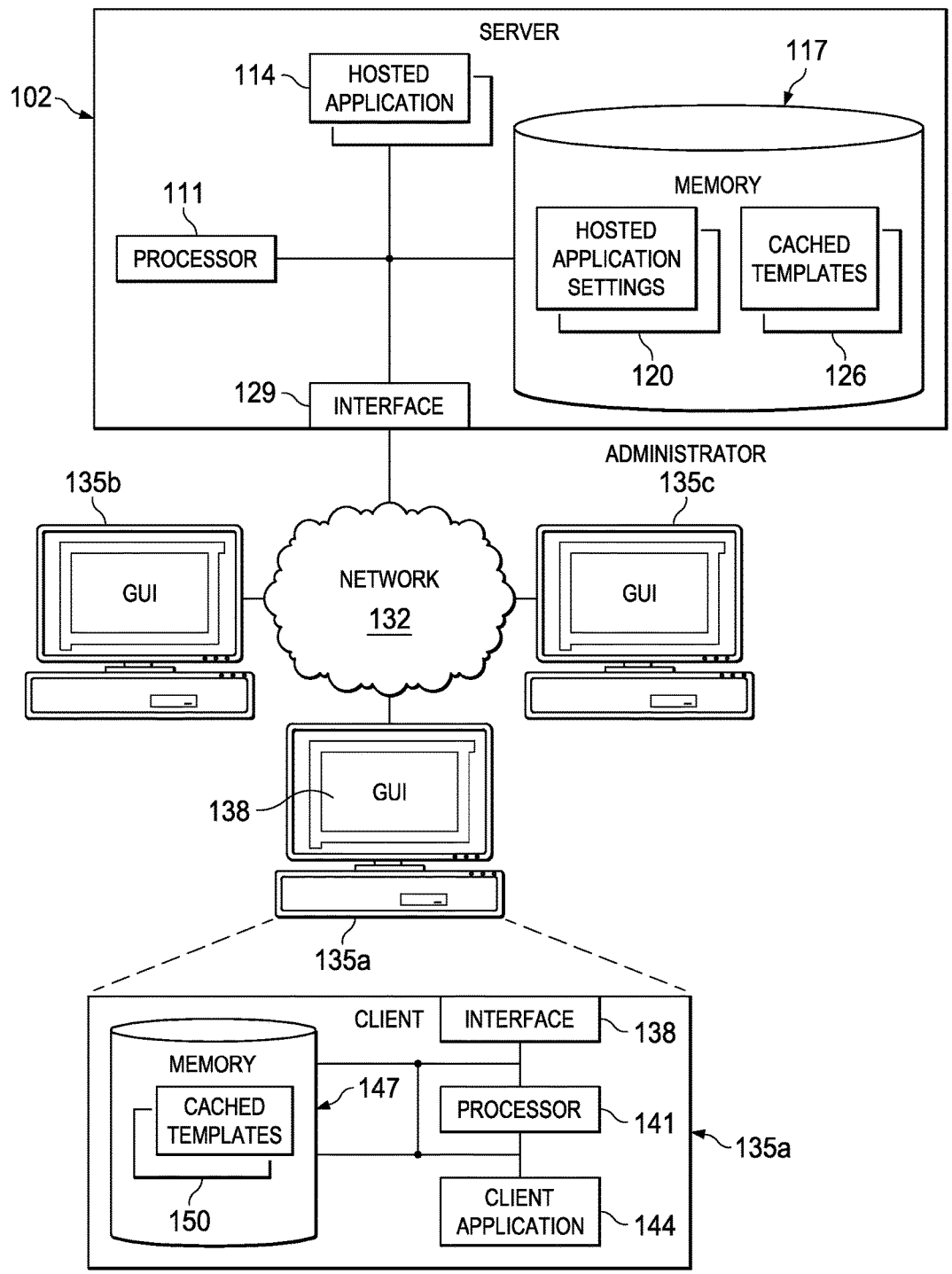
FIG. 1 depicts an example high-level architecture in accordance with implementations of the present disclosure.

FIG. 1 depicts an example architecture 100 in accordance with implementations of the present disclosure. The example architecture 100 includes or is communicably coupled with server 102 and one or more clients 135, at least some of which communicate across network 132. In general, architecture 100 depicts an example configuration of a system capable of providing streamlining end-to-end flow of B2B integration processes in response to requests from its clients 135.

In general, the server 102 is any server that stores one or more hosted mapping applications 114, where at least a portion of the hosted mapping applications 114 are executed via requests and responses sent to users or clients within and communicably coupled to the illustrated architecture 100 of FIG. 1. In some instances, the server 102 may store a plurality of various hosted mapping applications 114, while in other instances, the server 102 may be a dedicated server meant to store and execute only a single hosted B2B integration process application 114. In some instances, the server 102 may comprise a web server, where the hosted mapping applications 114 represent one or more web-based or cloud-based applications accessed and executed via network 132 by the clients 135 of the system to perform the programmed tasks or operations of the hosted B2B integration process application 114.

At a high level, the server 102 includes an electronic computing device operable to receive, transmit, process, store, or manage data and information associated with the architecture 100. Specifically, the server 102 illustrated in FIG. 1 is responsible for receiving application requests from one or more client mapping applications 144 associated with the clients 135 of architecture 100 and responding to the received requests by processing said requests in the associated hosted mapping application 114, and sending the appropriate response from the hosted mapping application 114 back to the requesting client mapping application 144. In addition to requests from the external clients 135 illustrated in FIG. 1, requests associated with the hosted mapping applications 114 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, architecture 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the example implementation, and as shown in FIG. 1, the server 102 includes a processor 111, an interface 129, a memory 117, and one or more hosted mapping applications 114. The interface 129 is used by the server 102 for communicating with other systems in a client-server or other distributed environment (including within architecture 100) connected to the network 132 (e.g., client 135, as well as other systems communicably coupled to the network 132). Generally, the interface 129 comprises logic encoded in software and/or hardware in a suitable combination and operable to communicate with the network 132. More specifically, the interface 129 may comprise software supporting one or more communication protocols associated with communications such that the network 132 or interface's hardware is operable to communicate physical signals within and outside of the illustrated architecture 100.

Generally, the network 132 facilitates wireless or wireline communications between the components of the architecture 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet.

In some instances, a portion of the network 132 may be a virtual private network (VPN), such as, for example, the connection between the client 135 and the server 102. Further, all or a portion of the network 132 can comprise either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated architecture 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular requirements, desires, or particular embodiments of architecture 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted mapping applications 114. Specifically, the server's processor 111 executes the functionality required to receive and respond to requests from the clients 135 and their respective client mapping applications 144, as well as the functionality required to perform the other operations of the hosted mapping application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others.

It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated architecture 100, processor 111 executes one or more hosted mapping applications 114 on the server 102.

At a high level, each of the one or more hosted mapping applications 114 is any application, program, module, process, or other software that may execute, change, delete, generate, or otherwise manage information according to the present disclosure, particularly in response to and in connection with one or more requests received from the illustrated clients 135 and their associated client mapping applications 144. In certain cases, only one hosted mapping application 114 may be located at a particular server 102. In others, a plurality of related and/or unrelated hosted mapping applications 114 may be stored at a single server 102, or located across a plurality of other servers 102, as well. In certain cases, architecture 100 may implement a composite hosted mapping application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others.

Additionally, the hosted mapping applications 114 may represent web-based applications accessed and executed by remote clients 135 or client mapping applications 144 via the network 132 (e.g., through the Internet). Further, while illustrated as internal to server 102, one or more processes associated with a particular hosted mapping application 114 may be stored, referenced, or executed remotely. For example, a portion of a particular hosted mapping application 114 may be a web service associated with the application that is remotely called, while another portion of the hosted mapping application 114 may be an interface object or agent bundled for processing at a remote client 135. Moreover, any or all of the hosted mapping applications 114 may be a child or sub-module of another software module or enterprise application (not illustrated) without departing from the scope of this disclosure. Still further, portions of the hosted mapping application 114 may be executed by a user working directly at server 102, as well as remotely at client 135.

The server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted mapping applications 114. Additionally, memory 117 may include any other appropriate data, such as VPN applications, firmware logs and policies, firewall policies, a security or access log, print or other reporting files, as well as others.

Specifically, illustrated memory 117 includes a set of hosted mapping application settings 120 and a set of cached templates of B2B standard message 126. Although illustrated within memory 117, some or all of the illustrated elements may be located or stored outside of memory 117 and/or server 102 (e.g., in different memories and/or on multiple different servers, as well as in other locations external to, but communicably coupled with, architecture 100). For example, the set of hosted mapping application settings 120 may be included within the programming of each associated hosted mapping application 114 such that the settings are inherent to the hosted mapping application 114 itself. Additionally, some or all of the set of hosted mapping application settings 120 may be stored at and specific to a particular client 135, and stored in the client's respective memory. In those instances, particular settings stored at the client 135 can be sent along with the requests to the hosted mapping application 114 in order to allow the hosted mapping application 114 to be initialized and executed in accordance with the proper settings. In general, the set of hosted mapping application settings 120 may include information such as a particular hosted mapping application's 114 preferred modes of operation for various requests and operations. Additionally, any other information relevant to the particular hosted mapping applications 114 can be stored in and included with the set of hosted mapping application settings 120 in particular embodiments.

Illustrated memory 117 also includes a set of cached templates of B2B standard message 126 representing the templates of B2B standard message used by the hosted mapping applications. Specifically, memory 117 is accessed by the hosted mapping application 114 as requests and context data are received, and updated as those templates of B2B standard message are processed and new message guidelines are generated. In order to preserve memory space, all or a portion of the set of cached templates of B2B standard message 126 may be associated with a particular timeout value, such that specific portions of the cached templates of B2B standard message 126 acts as temporary storage of the templates of B2B standard message of the hosted mapping applications 114.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a, each client 135 includes a processor 141, an interface 138, a graphical user interface (GUI) 138, a client mapping application 144, and a memory 147. In general, each client 135 comprises an electronic computer device operable to receive, transmit, process, and store any appropriate data associated with the architecture 100 of FIG. 1. It will be understood that there may be any number of clients 135 associated with, or external to, architecture 100. For example, while illustrated architecture 100 includes three clients (135a, 135b, and 135c), alternative implementations of architecture 100 may include a single client 135 communicably coupled to the server 102, or any other number suitable to the purposes of the architecture 100. Additionally, there may also be one or more additional clients 135 external to the illustrated portion of architecture 100 that are capable of interacting with the architecture 100 via the network 132. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted mapping application 114) or the client 135 itself, including digital data, visual information, the client mapping application 144, or the GUI 138. Both the input and output device may include fixed or removable storage media such as a magnetic storage media, CD-ROM, or other suitable media to both receive input from and provide output to users of the clients 135 through the display, namely, the GUI 138.

As indicated in FIG. 1, client 135c is specifically associated with an administrator of the illustrated architecture 100. The administrator 135c can modify various settings associated with one or more of the other clients 135, the server 102, the hosted mapping application 114, and/or any relevant portion of architecture 100. For example, the administrator 135c may be able to modify the relevant timeout values associated with each hosted mapping application 114, as well as any of the set of hosted mapping application settings 120.

Importantly, each client 135 includes a client mapping application 144 associated with the hosted mapping application 114. In particular, the client mapping application 144 is any software, such as a web browser or remote portion of the hosted mapping application 114 that allows the client 135 to access and work with the hosted mapping application 114. Particularly, the client mapping application 144 is a software application that enables the client 135 (or a user thereof) to display and interact with one or more of the hosted mapping applications 114 executed at the server 102. Where the hosted mapping applications 114 are web-based applications, the client mapping application 144 may be specific applications dedicated to use with a particular hosted mapping application 114, a general web browser with adequate functionality to interact with the hosted mapping application 114, or any other appropriate software.

Further, the illustrated client 135 includes a GUI 138 comprising a graphical user interface operable to interface with at least a portion of architecture 100 for any suitable purpose, including generating a visual representation of the client mapping application 144 (in some instances, the client's web browser) and the interactions with the hosted mapping application 114, including the responses received from the hosted mapping application 114 received in response to the requests sent by the client mapping application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in architecture 100 and efficiently presents the information results to the user.

In general, the GUI 138 may include a plurality of user interface (UI) elements, some or all associated with the client mapping application 144, such as interactive fields, pull-down lists, and buttons operable by the user at client 135. These and other UI elements may be related to or represent the functions of the client mapping application 144, as well as other software applications executing at the client 135. In particular, the GUI 138 may be used to present the client-based perspective of the hosted mapping application 114, and may be used (as a web browser or using the client mapping application 144 as a web browser) to view and navigate the hosted mapping application 114, as well as various web pages located both internal and external to the server, some of which may be associated with the hosted mapping application 114. For purposes of the present location, the GUI 138 may be a part of or the entirety of the client mapping application 144, while also merely a tool for displaying the visual representation of the client and hosted mapping applications' 114 actions and interactions. In some instances, the GUI 138 and the client mapping application 144 may be used interchangeably, particularly when the client mapping application 144 represents a web browser associated with the hosted mapping application 114.

Similar to the server 102, the illustrated clients 135 include both an interface 138 and processor 141. The interface 138 of each client 135 may be similar to the interface 129 of the server 102, in that it may comprise logic encoded in software and/or hardware in a suitable combination and operable to communicate with the network 132. More specifically, interface 138 may comprise software supporting one or more communication protocols such that the network 132 or hardware is operable to communicate physical signals to and from the client 135. The client's processor 141 may also be similar in nature to that of the server's processor 111. Again, although only illustrated as a single processor 141, two or more processors may be used according to particular requirements, desires, or embodiments of architecture 100.

Similar to the server's processor 111, each client processor 141 may be a central processing unit (CPU), a blade, an application specific integrated circuit (ASIC), a field-programmable gate array (FPGA), or another suitable component. Generally, the processor 141 executes instructions and manipulates data to perform the operations of the client 135 and, specifically, the associated client mapping application 144 described above. Specifically, the client's processor 141 executes the functionality required to send requests from the client 135 and its client mapping application 144, as well as receive and process the associated responses from the hosted mapping application 114.

Each client 135 also includes a memory 147. Memory 147 may be similar to the server's memory 117, and may include any memory or database module, taking the form of either volatile or non-volatile memory including, without limitation, magnetic media, optical media, random access memory (RAM), read-only memory (ROM), removable media, or any other suitable local or remote memory component. For example, memory 147 may store backup data, parameters, cookies, variables, algorithms, instructions, rules, or references thereto, as well as any other suitable data.

As specifically illustrated, memory 147 includes a set of cached templates of B2B standard message 150 associated with the client mapping application 144. The set of cached templates of B2B standard message 150 is used by the client mapping application 144 to cache, or store templates of B2B standard message associated with business contexts of the hosted mapping application 114. In some instances, the set of cached templates of B2B standard message 150 may store only the most recently used templates of B2B standard message associated with the hosted mapping application 114, while in other instances, the set of cached templates of B2B standard message 150 may store all templates of B2B standard message. When the client mapping application 144 generates a set of context data to be sent to the hosted mapping application 114, the client mapping application 144 can access the set of cached templates of B2B standard message 150 to retrieve and integrate matching templates of B2B standard message for being used in the hosted mapping application 114.

While FIG. 1 is described as containing or being associated with a plurality of elements, not all elements illustrated within architecture 100 of FIG. 1 may be utilized in each alternative implementation of the present disclosure. Additionally, one or more of the elements described herein may be located external to architecture 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
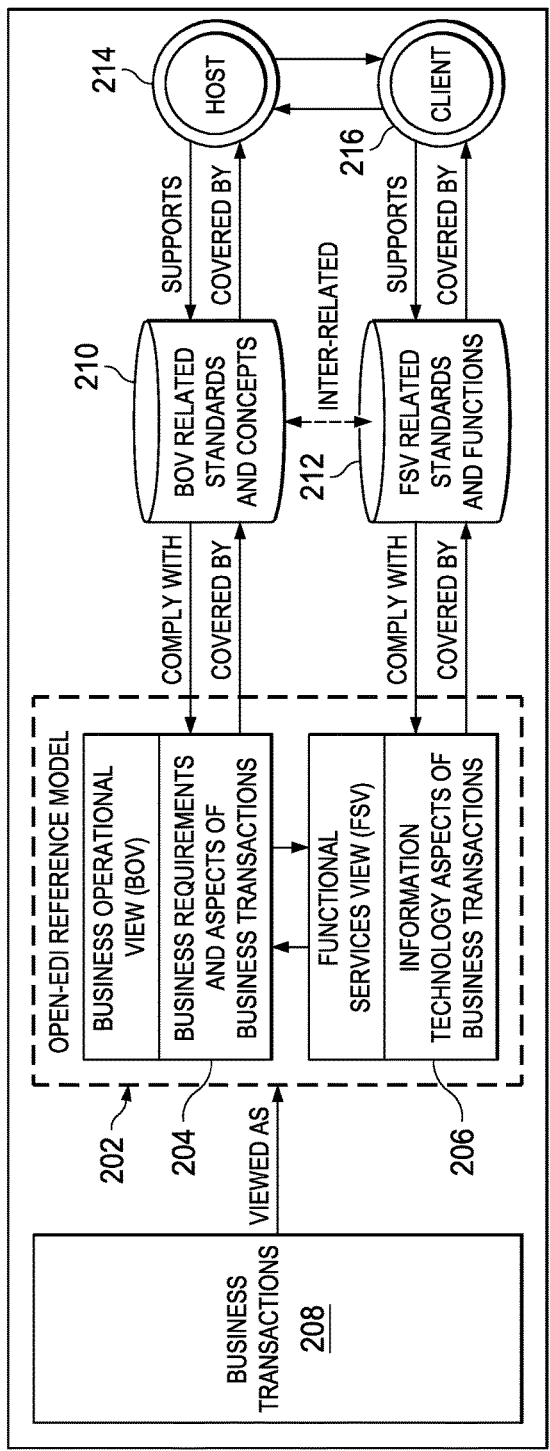
FIG. 2 depicts an example system that can be used to execute implementations of the present disclosure.

FIG. 2 is a diagram depicting an example mapping system 200. The example mapping system 200 can include an open electronic data interchange (EDI) reference model 202. The open-EDI reference model 202 includes two views, which are the business operational (BOV) view 204 and the functional services (FSV) view 206. The open-EDI reference model 202 is communicably coupled to business transactions 208 and a BOV database 210 and a FSV database 212. The BOV database 210 is communicably coupled to a host 214 and the FSV database 212 is communicably coupled to a client 216. The host 214 and the client 216 can be business partners interested in processing the business transactions 208.

The BOV view 204 can illustrate the results of processing the business transactions 208 according to a first set of requirements of the open-EDI reference model 202. For example, the BOV view 204 can illustrate aspects regarding the making of business decisions and commitments among persons, which are needed for the description of a business transaction. The BOV view 204 can address aspects that apply to the business requirements of the open-EDI reference model 202, such as: the semantics of business data in business transactions and associated data interchanges and the rules for business transactions. The rules for business transactions can include operational conventions, agreements, and mutual obligations.

The BOV database 210 includes BOV related standards. The BOV related standards are tools and rules by which business process experts, who understand the operating aspects of a business domain, may create scenarios. Registration authorities can reference the BOV related standards when considering scenarios such as templates for registration. The BOV related standards and the BOV templates can be accessed by the host 214 and the client 216, such as standard content owners and standard content reviewers.

The FSV view 206 can illustrate the results of processing the business transactions 208 according to a second set of requirements of the open-EDI reference model 202. For example, the FSV view 206 can illustrate the perspective of business transactions including the information technology interoperability aspects of information technology (IT) systems required to support the execution of transactions for the open-EDI reference model 202. The FSV view 206 focuses on the IT aspects of functional capabilities, service interfaces and syntax representations and protocols (e.g., communication protocols). The functional capabilities, services interfaces and protocols include: capability of initiating, operating and tracking the progress of transactions in the open-EDI reference model 202, user application interface, transfer infrastructure interface, security mechanism handling, protocols for inter working of information technology systems of different organizations and translation mechanisms.

The FSV database includes FSV standards and functions. The FSV standards can be used by the host 214 and the client 216. For example, the FSV standards can be used by integration developers. The integration developers can retrieve and use the FSV standards and functions to design and/or build IT systems, which support the business requirements. The users of the open-EDI reference model 202 can produce products and services conforming to FSV related standards, which can support the execution of transactions in the open-EDI reference model 202.

The host 214 can also transform the message definitions of the standards to artifacts and properties. A standard message definition consists of types and their fields. A standard type is transformed to an artefact, and the fields of the standard type to properties owned by the artefact. The name of the standard type is used as name for the artefact. The host 214 can deal with templates and message guides of the B2B standards. In some examples, the same name is used for two fields in two different standards, although the fields have different semantic meaning. The host 214 does not consolidate or reuse across different standards. In some examples, the same name is used for two types in two different standards although the types have different semantic meaning. For example, a type with name ORDR can be included in the ASC X12 and UN EDIFACT. In order to ensure that types with the same name but different semantic meaning are transformed to different artifacts, multiple type systems can be used (e.g., type systems 302, 304 and 306 in FIGS. 3A-3C). Each standard can be mapped to a type system.

In some implementations, the open-EDI reference model 202 can be used to generate a plurality of concepts. For example, the BOV view 204 can be used to generate templates, including message guidelines and mapping guidelines. A template can provide a complete set of message types, complex types, simple types, code lists and identification schemes as defined, maintained and provided by the host 214 or client 216. Templates can be used for definition of subsets considering the aspects required for the business purpose, such as the message guidelines. Templates can be expressed by type systems and can have different versions.

Message guidelines can be a part of the BOV view 204. Message guidelines can include a detailed documentation of a B2B message type considering the aspects and constraints corresponding to the business requirements of a particular business context. Message guidelines can provide a common and unambiguous understanding of the message type between the host 214 and the client 216 that are involved in the whole integration process of the mapping. A message guideline can include multiple aspects, such as the selected business context of the message guideline, a subset structure, a qualification of semantically generic elements or element groups, subsets of code values of used code lists, formal integrity constraints of elements or related elements, informal usage rules, and descriptions.

The subset structure can be a structure of a selected message type corresponding to a particular version of a specific type system corresponding to the business requirements. The qualification of semantically generic elements or element groups can be a semantic precision derived by adding specific qualifier values to the predefined qualifier references. The subsets of code values of used code lists can be required by the message guidelines. Examples of descriptions include user specific definitions, usage examples, instance examples and remarks. Message guidelines can be stored in the host's database and can be free of any technical syntax representation. Any message guideline can be represented using different technical syntaxes such as XSD, OData (JSON), Data Base Schemes or other.

The mapping guideline generated by Business Process Experts interacting with the BOV view 204. The mapping guideline can be a detailed documentation of a mapping between two message guideline (e.g., a Source Message Guideline and a Target Message Guideline). The mapping guideline can include the mapping entities between the appropriate elements or constraints of the source message guideline and a target message guideline for fulfilling the requirements associated to a business context. The mapping guideline can provide a common and unambiguous understanding of the mapping between all users that are involved in the mapping process.

The mapping guideline can include a plurality of aspects, such as selected business context of the mapping guidelines, the required source message guideline, the required target message guideline, the mapping entities between the appropriate elements of the source message guideline and target message guideline, mapping entities between the appropriate constraints and/or elements, code value mapping between the appropriate codes of code lists, informal usage rules of the mapping entities and descriptions. Examples of descriptions include user specific definitions, usage examples, instance examples and remarks of the mapping entities. Mapping guidelines can be stored in the host's database and can be free of any technical syntax representation. Each mapping guideline can be transferred into different technical syntax representations, such as NetWeaver (NW) Process Integration (PI) message mapping, XSLT, or other representations.

In some implementations, the FSV view 206 can be used to generate an interface schema, a message mapping and constraint validation rules. The interface schema can be a technical representation of a message guideline. The interface schema considers the functional aspects that are required for the validation, consumption or processing of data that are based on the interface schema. The interface schema can be aligned to an XML Schema Definition (XSD) language, which can be used for the description and validation of XML based data. The message mapping can be a technical representation of a mapping guideline. The message mapping can consider the functional aspects that are required for the conversion of a source instance (e.g., payload) into a target instance in runtime and according the rules as defined in a Mapping Guideline. For the client, the message mapping can be based on the message mapping language as defined for NW PI.

Figure 3A:
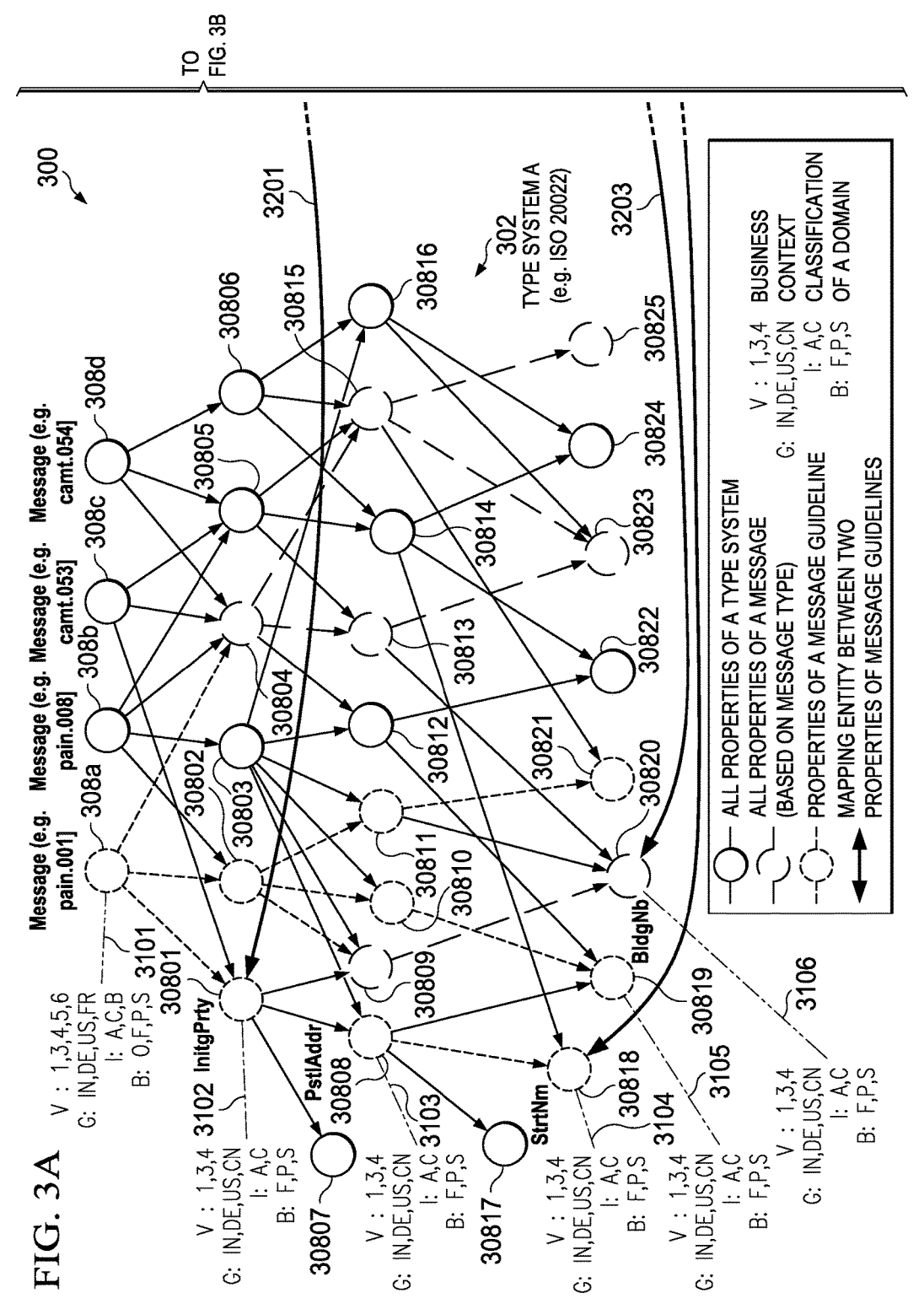
Figure 3B:
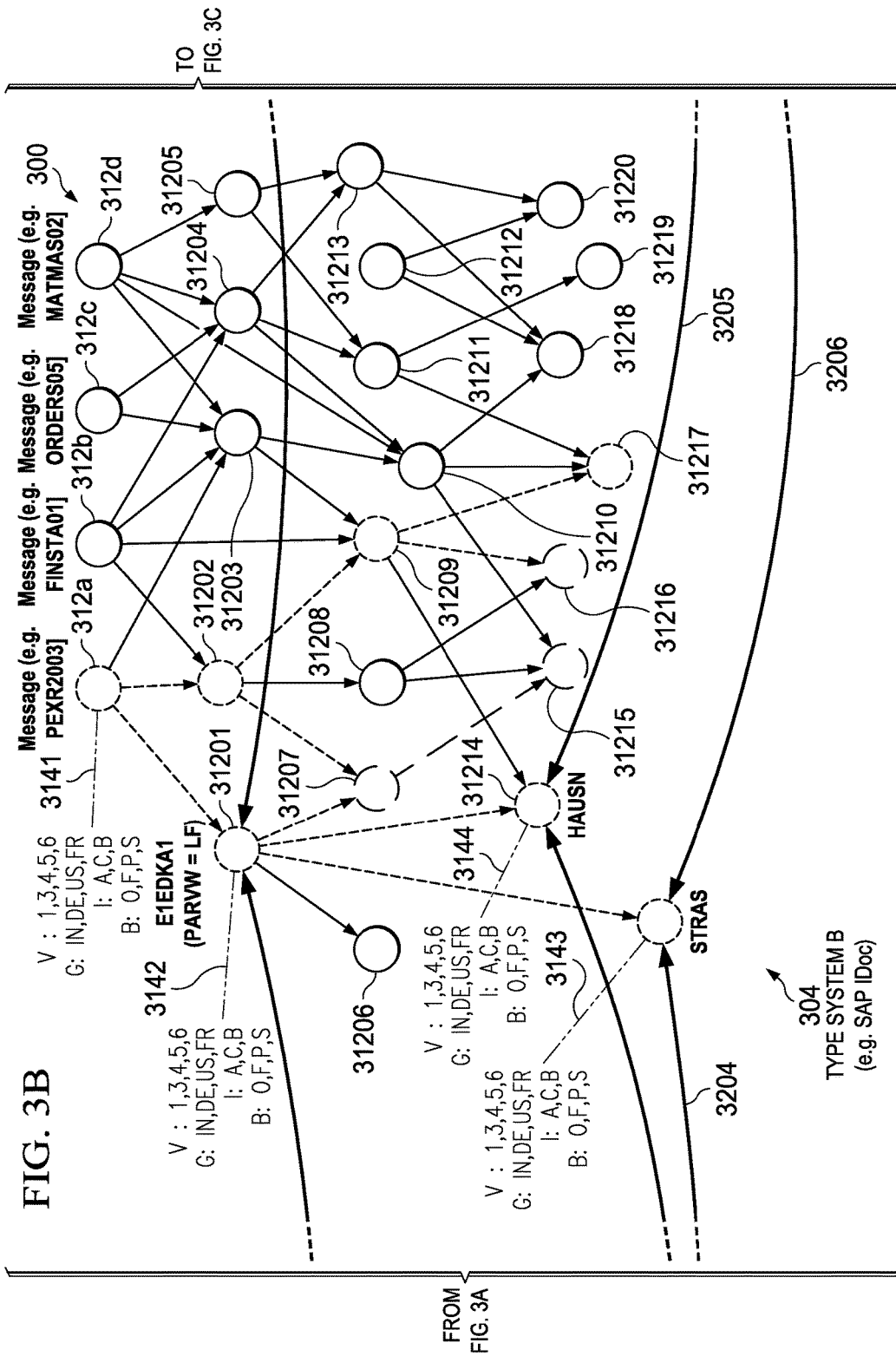
Figure 3C:
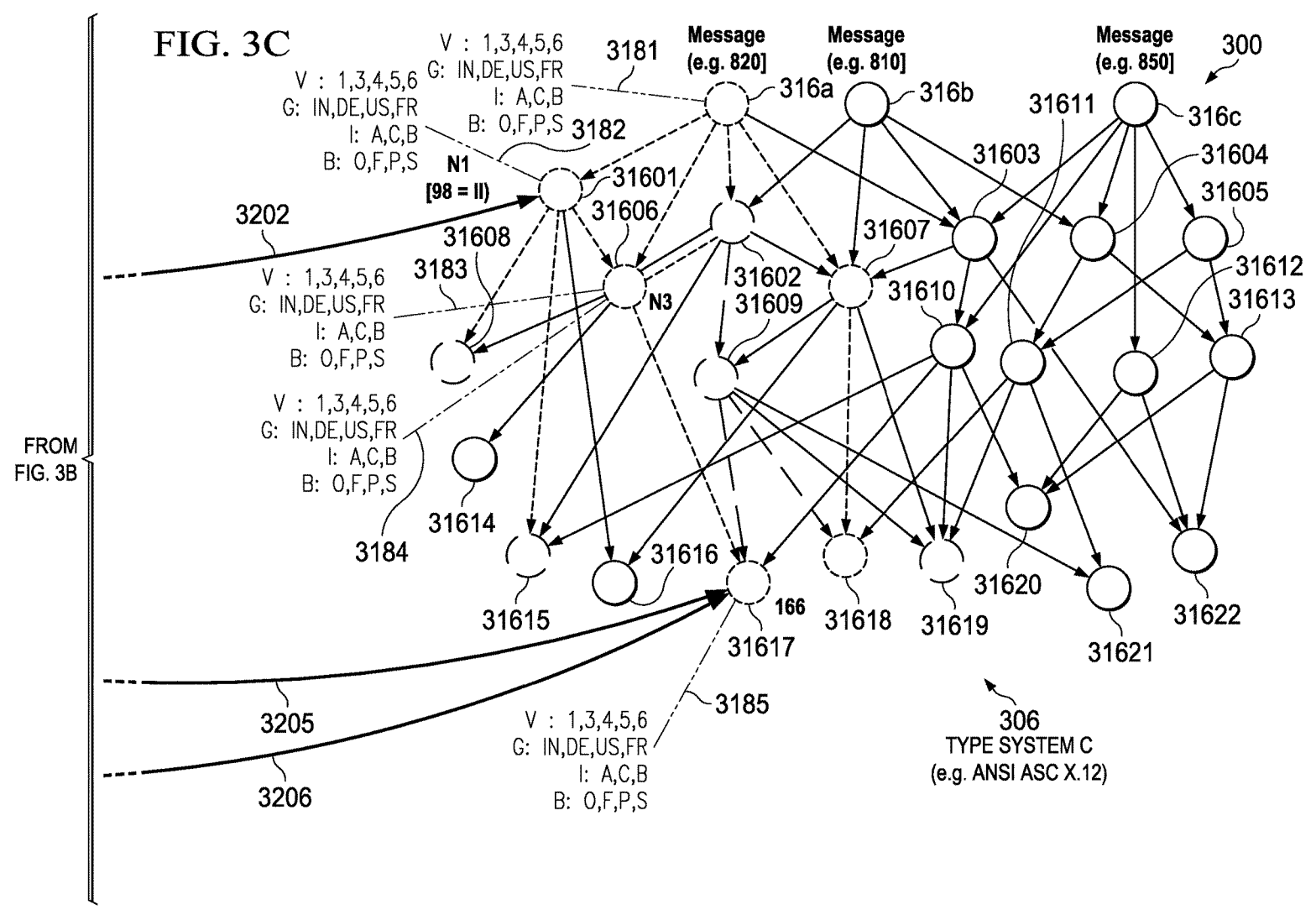

The host 214 can be responsible for the development and provision of templates, including message (implementation) guidelines, and mapping guidelines. Alternatively, the client 216 can be responsible for the development and provision of templates, message (implementation) guidelines, and mapping guidelines. The mapping information can be stored in an index, which can be a graphical based representation of the content displayed by BOV view 204 (as illustrated in FIGS. 3A-3C). The content is also consolidated and classified according to the business context logic, which enables the reusability and the proposal services for building new content. Some generators can generate platform syntax specific representations of the (source/target) message guidelines as well as mapping guidelines as required for the deployment on a client or NWPI runtime.

The host 214 or the client 216, which is responsible for the mapping process, can receive a message guideline from the business partner and generate the mapping. Generating the mapping can include a syntax conversion rule at the inbound channel. For example, the syntax conversion can be used to transform a non-XML syntax into an XML syntax for a source instance set to process XML syntaxes. In some implementations, the host 214 can interact with the client 216 to define a constraint specific validation and a schema definition language.

FIGS. 3A-3C depict an example storage model 300. The example storage model 300 can be organized into a direct acyclic graph (DAG) 300, which stores a content that persists all platform syntax dependent data. The example storage model 300 can include multiple trees 302, 304 and 306. Each tree 302, 304 and 306 can correspond to a type system. A type system can provide the complete system of a B2B library. The example storage model 300 can include a complete set of type systems stored as a trees 302, 304 and 306 with a plurality of nodes. Each type system can include multiple versions. Different versions of the same type system can be handled by the host system the same way as two completely different type systems, enabling full compatibility of the DAG 300 for any version. In some implementations, the consolidation or interchangeable reuse of different type system versions is limited or forbidden.

The nodes can represent properties, such as message, group element or data elements. The nodes can include root nodes and child nodes. The child nodes can be intermediate nodes or leaf nodes. For example, the tree 302 corresponding to type system A includes root nodes 308a, 308b, 308c and 308d and the child nodes 30801-30825. The child nodes 30801-30806 of the tree 302 are examples of intermediate nodes. The child nodes 30807 and 30807-30825 of the tree 302 are examples of leaf nodes. The root nodes can be messages, the intermediate nodes can be group elements, and the leaf nodes can be data elements with associated values.

Messages groups and data elements can be based on types (e.g., message, complex or simple types). The tree can include a single node per message kind, group kind or element kind. The nodes can be independent of the number of versions or different domain and user variations. In some implementations, a node can include all properties of a type system. For example, nodes 308b, 308c and 308d can include the properties of type system A. Multiple templates can be unified for a type system to represent a superset graph including the nodes that include all properties of the type system. In some implementations, a node can include all properties of a message, based on a message type. For example, nodes 30804, 30809, 30813 and 30815 can include the properties of a message.

A message of a template requires a subset of the nodes, and it can include all versions. A differentiation between versions can be achieved by a business context specific classification, whereby the version is a context category itself. In some implementations, the business context classification of a domain can be included in a hashtag associated to the node. A domain can indicate the relationship between an artefact and a message guideline (e.g., template) and between a property and a message guideline. The domains indicate which artifacts and which properties represent a message guideline. The domains enable the counting of the number an artefact or property is used in message guidelines. As illustrated in FIGS. 3A-3C, the root node 308a can include the hashtag 3101 including the corresponding domain.

In some implementations, a node can include properties of a message guideline. For example, nodes 308a, 30801 and 30802-30815 can include properties of a message guideline. The message guidelines can use the same stored properties and types. The differentiation of what is used in a particular message guideline can be achieved by the business context classification via domains, as included in the hashtags. Each property of a message guideline can correspond to a domain with the message guideline's business context values. The domain data indicates how a particular property is used in a business context. The example storage model 300 can include a plurality of mapping entities 3201-3206. The mapping entities can connect the mapped properties of different type systems. For example, mapping entity 3201 connects the node 30801 of tree 302 corresponding to type system A to the node 31201 of tree 304 corresponding to type system B. The mapping entities can enable the suggestion of mappings via a transitive approach. The mapping entities can be automatically generated in response to a query processed by a data model. The central entities of the data model are called artifacts and properties. A property corresponds to a particular artefact and it includes a base artefact which defines the structure of the property. A simple artefact is not associated to properties. An artefact instance is reusable and is identified by its name and type system version. A property instance is uniquely identified by its artefact instance its name and the instance of the base artefact. An artefact can be uniquely identified by its name and by its type system version.

The data model includes a correlation method. The correlation method can include a semantic correlation of the content of the nodes. For example, the content of the node 30801 of tree 302 can include the semantic data "house" and the content of the node 31201 of tree 304 can include the semantic data "building," which generates the mapping entity 3201 when the nodes of the tree 302 are semantically correlated to the nodes of the tree 304. In some implementations, a user interacting with the example storage model 300 can add or remove mapping entities. The storage of correlated information by using a DAG makes the reusability of information possible and more efficient.

Figure 4:
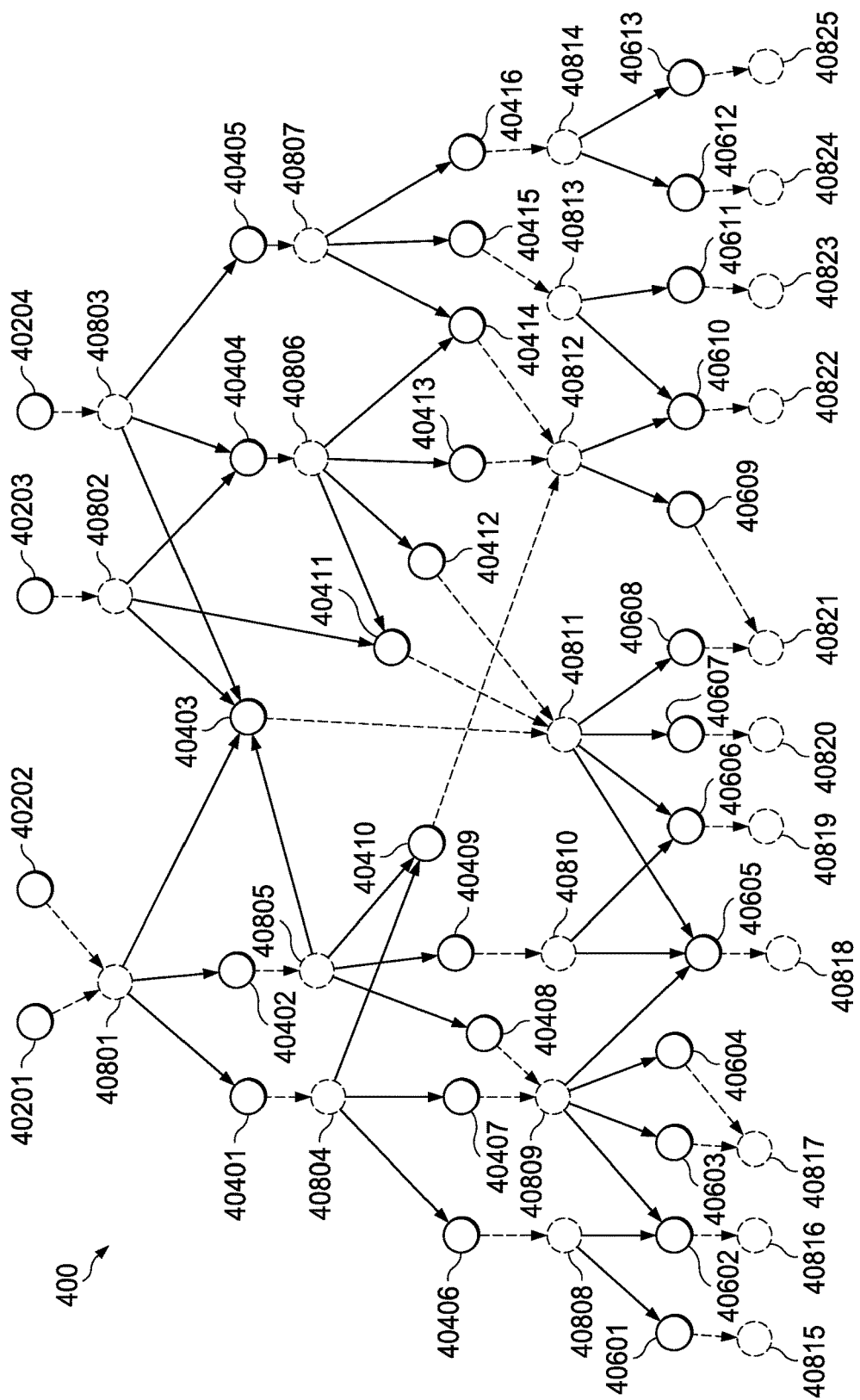
FIG. 4 depicts example tree of a type systems that can be executed in accordance with implementations of the present disclosure.

FIG. 4, illustrates an example directed tree 400 of a type system . . . . The example directed tree 400 can be based on a directed acyclic graph (DAG). The example directed tree 400 can include a plurality of nodes and a plurality of edges connecting the nodes. The nodes can correspond to properties 40201-40204, 40401-40416 and 40601-40613 and artifacts 40801-40826. Each property 40201-40204, 40401-40416 and 40601-40613 can be based on artifacts 40801-40826. In some implementations, multiple properties, such as properties 40201 and 40202 are based on the same artefact 40801.

The properties can be categorized as root properties 40201-40204, intermediate properties 40401-40416 and leaf properties 40601-40613. The example directed tree 400 can include one ore more root properties 40201-40204, which are based like all other properties on artifacts. An artefact can be a complex type or a simple type. A complex type (e.g., artefact 40803) has intermediate properties (e.g., 40404 and 40405) or leaf properties. Intermediate properties (e.g., 40401-40416) can be based on complex types. Leaf properties (e.g., 40601-40613) can be based on simple types.

Figure 5A:
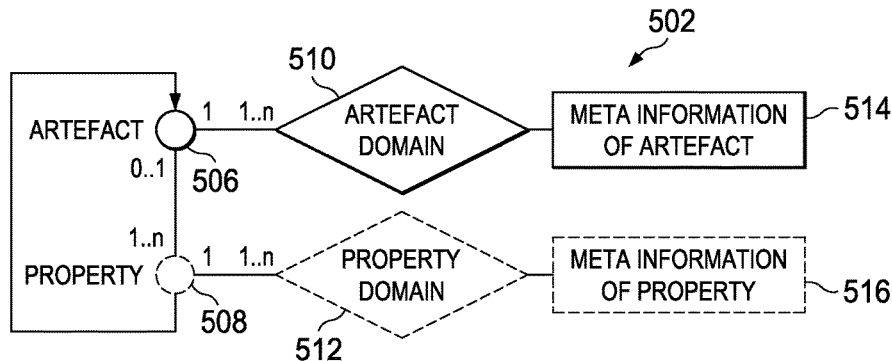
FIGS. 5A and 5B depict meta-models that can be executed in accordance with implementations of the present disclosure.
Figure 5B:
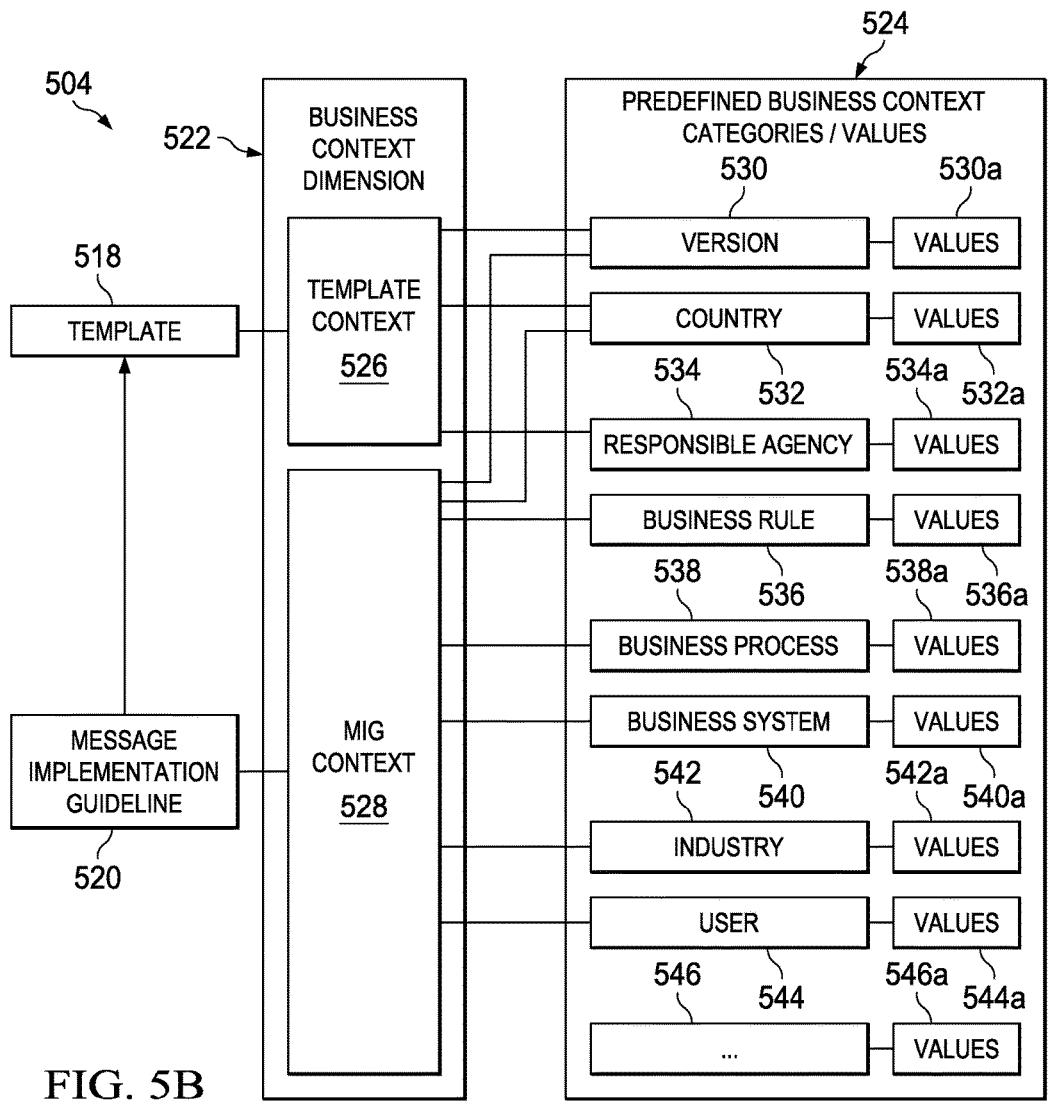

FIGS. 5A and 5B illustrate models for generating particular structures. For example, FIG. 5A illustrates a meta-model 502 for building the type system trees (e.g., example directed tree 400 of FIG. 4) and FIG. 5B illustrates a model 504 for generating a template or a message implementation guideline registration. The meta-model 502 includes an artefact 506, a property 508, an artefact domain 510, a property domain 512, a meta-information of artefact 514 and a meta-information of property 516. The artefact 506 includes one or more artefact domains 510. The property 508 includes one or more property domains 512. Each domain 510 and 512 provides the information about the usage in templates and message implementation guidelines of the artefact 506 or the property 508, respectively. The artefact domain 510 can refer to meta-information of artefact 514. The property domain 512 can refer to meta-information of property 516. Meta-informations 514 and 516 can include the path of ancestors, definition, notes, comments, rules in different languages and artefact or property characteristics. The characteristics can include occurrence, length, cardinality, values, formats, patterns and restrictions, such as min-/max inclusive or min-/max-exclusive characteristics corresponding to leaf properties.

The model 504 illustrated in FIG. 5B includes a template 518, a message implementation guideline 520, business context dimension 522 and predefined business context categories 528. The template 518 can be different from a message implementation guideline 520. The template 518 can be a complete structure of a message type, which can be provided by the standardization body. The message implementation guideline 520 can be a subset, which covers the aspects that are required by the business needs of a user. The template 518 provides the structure and all descriptions, rules, code lists and constraints as defined by the standardization body. The message implementation guideline 520 includes the subset of the structure, the refined descriptions, handling treatments and very specific rules or constraints, which are required so that the data can be unambiguously processed or used by applications.

The template 518 can be related to a business context dimension 522 and in particular to a template context 526. The message implementation guideline 520 can be related to a business context dimension 522 and in particular to a message implementation guideline context 528. Each of the template context 526 and the message implementation guideline context 528 can include a plurality of predefined business context categories 528. For example, the template context can include a version 530, a country or a responding agency 532 category. Each category 530-546 is associated to a value 530a-546a.

Figure 6A:
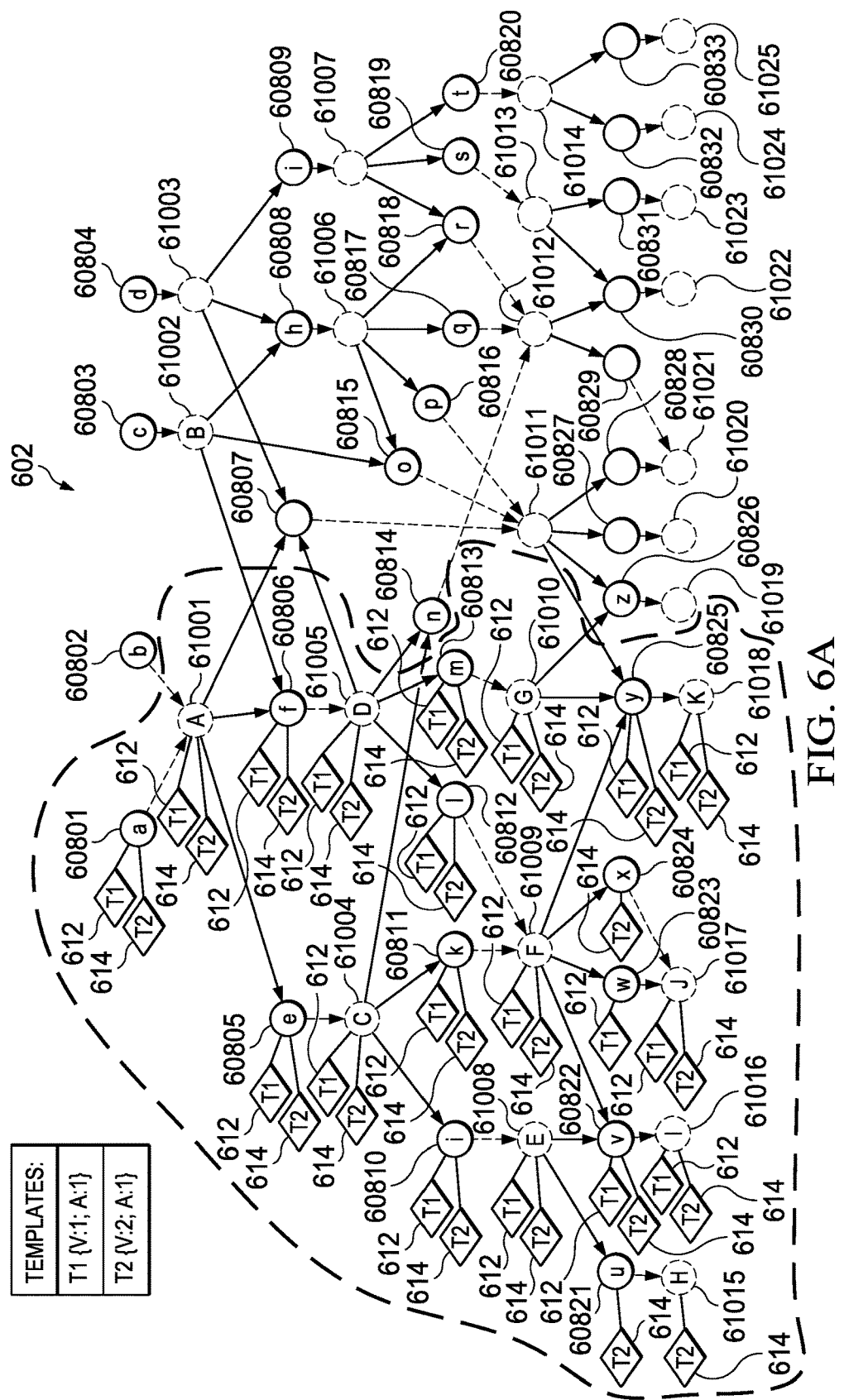
FIGS. 6A-6C depict example trees with business context assignment that can be executed in accordance with implementations of the present disclosure
Figure 6B:
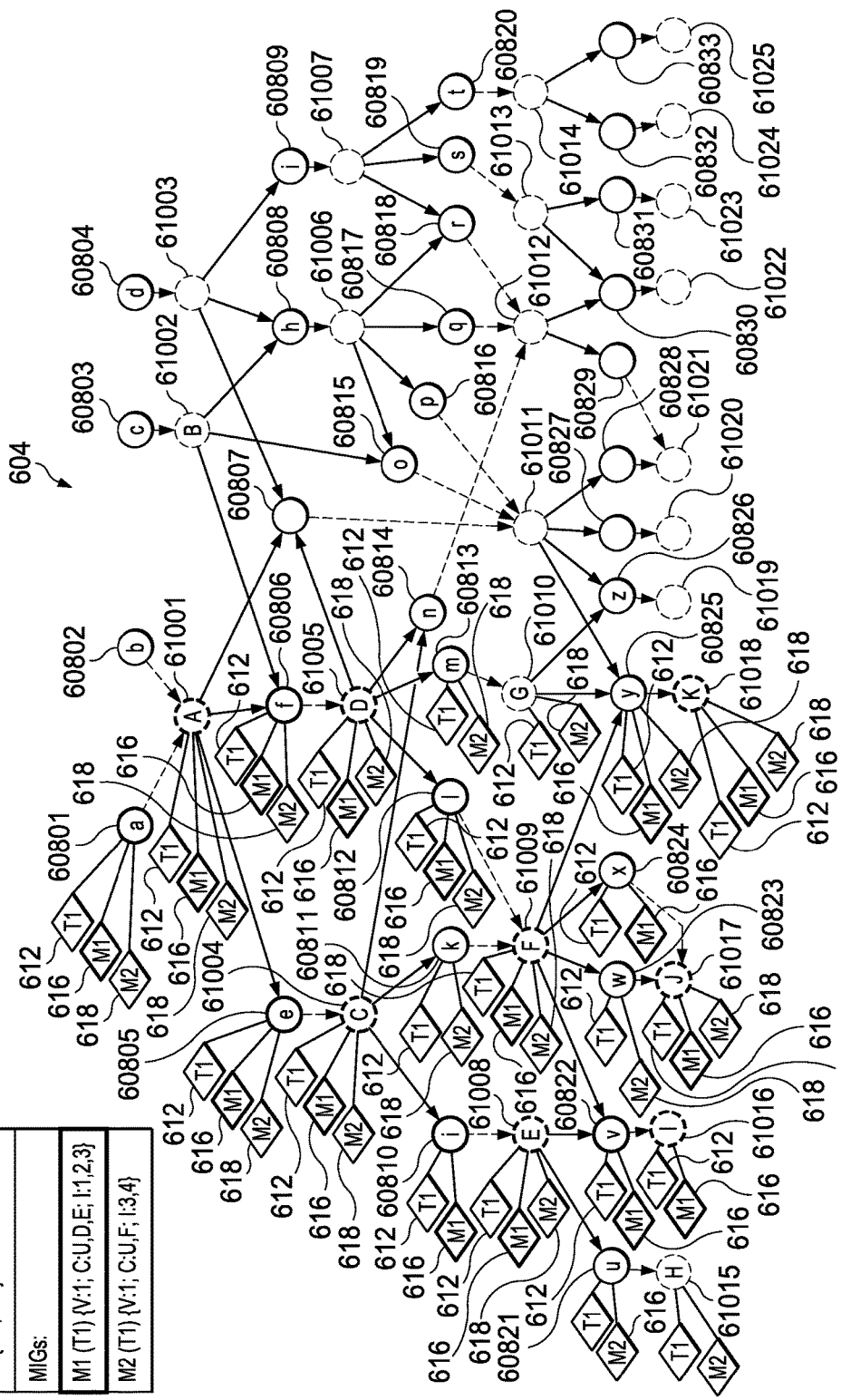
Figure 6C:
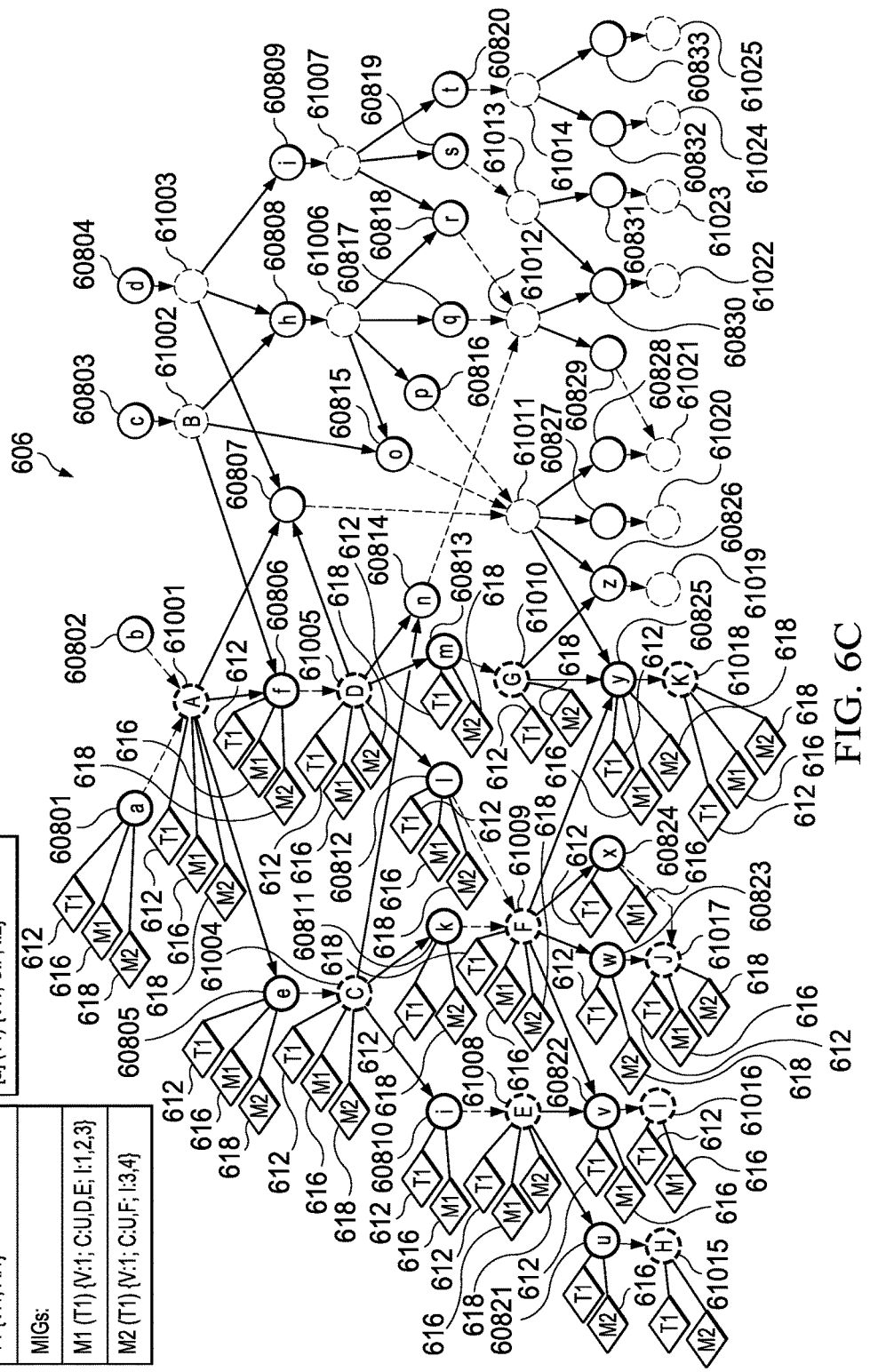

FIGS. 6A-6C illustrate example trees 602, 604 and 606 generated based on domain instances and business context assignments. The trees 602, 604 and 606 include a plurality of property nodes 60801-60833 and artefact nodes 61001-61025 connected by edges.

Each of the property nodes 60801-60833 and artefact nodes 61001-61024 can include a content and a hash entry. The content includes one or more of example elements of a data model, activities of a business process and an ontology. The hash entry includes a business context classification of a domain and indicates the associated templates (e.g., T1 612 and T2 614 as illustrated in FIGS. 6A-6C) and message implementation guidelines (e.g., M1 616 and M2 618 as illustrated in FIGS. 6B-6C).

The upper nodes 60801-60804 and 61001-61003 of the trees 602, 604 and 606 are the entry points that include major topics. The upper nodes 60801-60804 and 61001-61003 can be root nodes of data models or entry points of an ontology. The upper nodes 60801-60804 and 61001-61003 can be decomposed in child nodes 60805-60833 and 61004-61025. A child node may have further child nodes or could have leaf nodes. The leaf nodes 60822-60833 and 61015-61025 cannot be decomposed in other nodes.

In some implementations, the trees 602, 604 and 606 can be free trees. A free tree can be a tree without any designated root and where the node values correspond to the context values. As illustrated in FIG. 6C, the edges of the tree 606 can be classified by one or more domains (D). A domain includes context information as defined by a query. A domain classification identifies a relevant context for an edge between parent nodes and child nodes. The representation of the domain classification corresponds to a context specific tree, such as tree 606. The context specific tree 606 describes a meaningful correlation of information in a given context for nodes 41003, 41006, 41007 and 41010-41013.

The context specific tree 606 can be a hierarchical tree in a specific business context. When a user selects (for example by interacting with GUI 138 in FIG. 1) a query with a specific business context the context specific tree 606 can be derived from the example storage model (e.g., example storage model 300 of FIGS. 3A-3C) by a defined business context which is expressed on or more context categories and at least one or more context values in the defined context categories. The context specific tree 606 is an indicator for the query in a specific business context and the root element is representing the result of the business context query. The root element contains the business context set in which the hierarchical data model can be used. All subordinate entities of the tree have business context sets that are subsets of the upper or the root element. In the context specific root tree 606 the root element of the tree contains the context values for this context specific hierarchical data model. The context values of the upper elements of the tree contain sets with more context values then the lower, but there are subsets of the root element. The leaves of a tree represent the most specific context values of a data model. In the example illustrated in FIG. 6C, the context specific tree 606 corresponds to the context query [a] (T1){V:1; C:F; I:2}.

In some implementations, in order to represent a classified relation between nodes, an n-array N:M relation (called "domain") is defined between a parent node and its child nodes (also called as properties). The business context can be defined as a set of preconditions, under which the domain relation between a container entity and its properties is valid. The domain relation defines the subordinate relationships of a property entity to a container entity with the context restraint, which can be organized in a set of context units. In some implementations, a user can add rows of nodes to the trees 402 and 404 to specify if a property belongs to a set of business context values. Secondly the structure of the trees 402 and 404 provide exactly one SQL select statement to retrieve the relevant properties of an artifact for a given context combination. The number of entries in the database might increase in comparison to the existing model. But due to a reuse option, the number of entries in the database can be limited to an upper bound that is defined by the total amount of distinct business context set definitions. The trees 402 and 404 are reusable. If a user specifies a new set of categories (e.g., oil, china, retail), a new instance can be created, if the combination does not already exist. If the combination already exists, the existent trees can be reused. Modifying a context of business categories is not possible due to the fact that the context is immutable.

Figure 7:
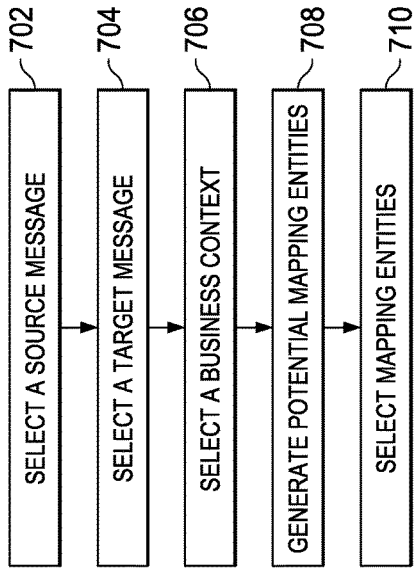
FIG. 7 depicts an example processes that can be executed in accordance with implementations of the present disclosure.

FIG. 7 depicts an example process 700 that can be executed in accordance with implementations of the present disclosure. In some examples, the example process 700 can be provided as one or more computer-executable programs executed using one or more computing devices, such as the system 100, described with reference to FIG. 1. At step 702, a source message guideline including a first plurality of elements is selected. In some implementations, the selection of the message guideline includes selecting a type system, a system version type and a message type. The selection of the message guideline can also include the selection of a message template, the selection of a business context, the generation of the source message guideline including a plurality of fields associated to the business context and the adaptation of the message guide by adding an additional field from a context menu. The business context includes one or more of an industry, a location, a business role, a business process and a business system. At step 704, a target message guideline including a second plurality of elements is selected. The target message guideline can be selected from a database or can be received from a business partner. At step 706, a business context corresponding to the source message guideline is selected.

At step 708, a plurality of potential mapping entities between the first plurality of elements and the second plurality of elements is automatically generated. The generation of the plurality of potential mapping entities includes determining an accuracy of correlation between the first plurality of elements and the second plurality of elements based a correlation coefficient and a persistence of each of the plurality of potential mapping entities. The correlation coefficient can be associated with semantic data associated with each of the first plurality of elements and the second plurality of elements. The persistence can be determined from relevant properties of each of the first plurality of elements and the second plurality of elements, limited by a total amount of distinct business context set definitions.

The plurality of potential mapping entities can be stored as a DAG (e.g., the storage model 300 illustrated in FIGS. 3A-3C). The DAG includes one or more root nodes defining entry points of an ontology and decomposing in one or more child nodes according to domain relations (e.g., the storage model 300 illustrated in FIGS. 3A-3C and the trees 402 and 404 illustrated in FIGS. 4A and 4B). The domain relations can define subordinate relationships of a property entity to a container entity for the context. Each of the one or more root nodes and the one or more child nodes can include a content and a hashtag. The content includes one or more of example elements of a data model, activities of a business process and an ontology. The hashtag includes a business context classification of a domain. At step 710, the mapping entities are selected from the plurality of potential mapping entities based on an accuracy threshold of the mapping entities. In some implementations, a second plurality of mapping entities are selected from the plurality of potential mapping entities based on a second accuracy threshold of the mapping entities.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing communication between businesses, the method comprising:

selecting a source message guideline comprising a first plurality of elements;

selecting a target message guideline comprising a second plurality of elements;

identifying a direct acyclic graph (DAG) associated with the source message guideline, the DAG including a plurality of trees that each correspond to a type system and that each include a plurality of nodes, the nodes representing properties of the source message guideline;

identifying, for each node of the plurality of nodes, a hashtag associated with the node, the hashtag indicating a business context corresponding to a domain associated with the source message guideline;

determining, based on the domain associated with each node, a subset of the properties of the source message guideline;

generating, based on the subset of the properties, a data model including a plurality of potential mapping entities between the first plurality of elements and the second plurality of elements;

providing a visibility of the plurality of potential mapping entities as a function of a correlation threshold of content between the first and the second plurality of elements;

automatically modifying a quantity of the plurality of potential mapping entities based on the correlation threshold, the modifying including adding and/or removing mapping entities from the plurality of potential mapping entities to define a subset of mapping entities;

determining that an option of the DAG indicates that the DAG, each of the plurality of trees included in the DAG, and each of the plurality of potential mapping entities are reusable;

based on determining that the option of the DAG indicates that the DAG and the plurality of mapping entities are reusable, limiting the number of entries associated with the data model to an upper bound, the upper bound based on a total amount of distinct business context set definitions that each includes a set of preconditions under which one or more domain relations between a container entity and its properties are valid; and storing in memory the subset of mapping entities for reuse.

2. The computer-implemented method of claim 1, wherein selecting the source message guideline comprises:
selecting a message template;
selecting a business context;
generating the source message guideline comprising a plurality of fields associated to the business context; and
adapting the message guide by adding an additional field from a context menu.

3. The computer-implemented method of claim 1, wherein selecting the message guideline comprises selecting a type system, a system version type and a message type.

4. The computer-implemented method of claim 1, wherein the business context comprises one or more of an industry, a location, a business role, a business process and a business system.

5. The computer-implemented method of claim 1, wherein generating the data model including the plurality of potential mapping entities comprises determining an accuracy of correlation between the first plurality of elements and the second plurality of elements based a correlation coefficient and a persistence of each of the plurality of potential mapping entities.

6. The computer-implemented method of claim 5, wherein the correlation coefficient is associated with semantic data associated with each of the first plurality of elements and the second plurality of elements.

7. The computer-implemented method of claim 5, wherein the persistence is determined from relevant properties of each of the first plurality of elements and the second plurality of elements, limited by a total amount of distinct business context set definitions.

8. The computer-implemented method of claim 1, wherein the directed acyclic graph comprises one or more root nodes defining entry points of an ontology and decomposing in one or more child nodes according to the one or more domain relations.

9. The computer-implemented method of claim 8, wherein the one or more domain relations define one or more subordinate relationships of a property entity to the container entity for the context.

10. The computer-implemented method of claim 8, each of the one or more root nodes and the one or more child nodes comprising a content.

11. The computer-implemented method of claim 10, wherein the content comprises one or more of example elements of a data model, activities of a business process and an ontology.

12. The computer-implemented method of claim 1, further comprising selecting a second plurality of mapping entities from the plurality of potential mapping entities based on a second accuracy threshold of the mapping entities.

13. A non-transitory computer-readable storage medium coupled to one or more processors and having instructions stored thereon which, when executed by the one or more processors, cause the one or more processors to perform operations for providing communication between businesses, the operations comprising:
selecting a source message guideline comprising a first plurality of elements;
selecting a target message guideline comprising a second plurality of elements;
identifying a direct acyclic graph (DAG) associated with the source message guideline, the DAG including a plurality of trees that each correspond to a type system and that each include a plurality of nodes, the nodes representing properties of the source message guideline;
identifying, for each node of the plurality of nodes, a hashtag associated with the node, the hashtag indicating a business context corresponding to a domain associated with the source message guideline;
determining, based on the domain associated with each node, a subset of the properties of the source message guideline;
generating, based on the subset of the properties, a data model including a plurality of potential mapping entities between the first plurality of elements and the second plurality of elements;
providing a visibility of the plurality of potential mapping entities as a function of a correlation threshold of content between the first and the second plurality of elements;
automatically modifying a quantity of the plurality of potential mapping entities based on the correlation threshold, the modifying including adding and/or removing mapping entities from the plurality of potential mapping entities to define a subset of mapping entities;
determining that an option of the DAG indicates that the DAG, each of the plurality of trees included in the DAG, and each of the plurality of potential mapping entities are reusable;
based on determining that the option of the DAG indicates that the DAG and the plurality of mapping entities are reusable, limiting the number of entries associated with the data model to an upper bound, the upper bound based on a total amount of distinct business context set definitions that each includes a set of preconditions under which one or more domain relations between a container entity and its properties are valid; and
storing in memory the subset of mapping entities for reuse.

14. A system, comprising:
a computing device; and
a computer-readable storage device coupled to the computing device and having instructions stored thereon which, when executed by the computing device, cause the computing device to perform operations for providing communication between businesses, the operations comprising:
selecting a source message guideline comprising a first plurality of elements;
selecting a target message guideline comprising a second plurality of elements;
identifying a direct acyclic graph (DAG) associated with the source message guideline, the DAG including a plurality of trees that each correspond to a type system and that each include a plurality of nodes, the nodes representing properties of the source message guideline;

identifying, for each node of the plurality of nodes, a hashtag associated with the node, the hashtag indicating a business context corresponding to a domain associated with the source message guideline;

determining, based on the domain associated with each node, a subset of the properties of the source message guideline;

generating, based on the subset of the properties, a data model including a plurality of potential mapping entities between the first plurality of elements and the second plurality of elements;

providing a visibility of the plurality of potential mapping entities as a function of a correlation threshold of content between the first and the second plurality of elements;

automatically modifying a quantity of the plurality of potential mapping entities based on the correlation threshold, the modifying including adding and/or removing mapping entities from the plurality of potential mapping entities to define a subset of mapping entities;

determining that an option of the DAG indicates that the DAG, each of the plurality of trees included in the DAG, and each of the plurality of potential mapping entities are reusable;

based on determining that the option of the DAG indicates that the DAG and the plurality of mapping entities are reusable, limiting the number of entries associated with the data model to an upper bound, the upper bound based on a total amount of distinct business context set definitions that each includes a set of preconditions under which one or more domain relations between a container entity and its properties are valid; and storing in memory the subset of mapping entities for reuse.

* * * * *